United States Patent [19]

Kodate

[11] Patent Number: 5,748,266
[45] Date of Patent: May 5, 1998

[54] COLOR FILTER, LIQUID CRYSTAL DISPLAY PANEL, LIQUID CRYSTAL DISPLAY, AND LIQUID CRYSTAL DISPLAY PANEL MANUFACTURING METHOD

[75] Inventor: Manabu Kodate, Yokohama, Japan

[73] Assignee: International Business Machines Corporation, Armonk, N.Y.

[21] Appl. No.: 615,012

[22] Filed: Mar. 11, 1996

[30] Foreign Application Priority Data

Mar. 10, 1995 [JP] Japan ................................. 7-050749

[51] Int. Cl.⁶ ...................... G02F 1/1339; G02F 1/1343
[52] U.S. Cl. ........................... 349/39; 349/106; 349/110;
349/139; 349/155; 349/187
[58] Field of Search ............................. 349/38, 39, 106,
349/155, 139, 156, 143, 110, 187; 430/20,
7; 359/891; 345/88

[56] References Cited

U.S. PATENT DOCUMENTS

| 4,470,667 | 9/1984 | Okubo et al. | 349/162 |
|---|---|---|---|
| 4,810,061 | 3/1989 | Nakanowatari et al. | 349/155 |
| 4,937,566 | 6/1990 | Clerc | 349/155 |
| 5,040,875 | 8/1991 | Noguchi | 349/107 |
| 5,181,132 | 1/1993 | Shindo et al. | 349/155 |
| 5,338,240 | 8/1994 | Kim | 349/110 |
| 5,446,562 | 8/1995 | Sato | 349/110 |

*Primary Examiner*—William L. Sikes
*Assistant Examiner*—Tai V. Duong
*Attorney, Agent, or Firm*—Ronald L. Drumheller

[57] ABSTRACT

To prevent a signal delay of an active-matrix liquid crystal display from occurring in an active-matrix liquid crystal display having an active element for each pixel electrode, a potential is supplied to a common electrode from a storage capacitance line by forming a pillar of a color filter to specify a cell gap between an array substrate having the storage capacitance line and a facing substrate having the color filter and electrically connecting the common electrode covering the pillar of the color filter with the storage capacitance line on the array substrate. Thereby, it is possible to disuse a transfer dotting process which is a factor of decreasing the yield and also a factor of decreasing the effective display area. Moreover, because the potential is supplied to the common electrode from the storage capacitance line, it is possible to prevent a signal delay of the common electrode from occurring and moreover realize a high-image-quality screen even in a large and high-definition liquid crystal display without causing irregularity of a display screen or decrease of a contrast ratio. Furthermore, because it is possible to disuse a spacer scattering process and specify a cell gap by securing the pillar of the color filter, not only the cell gap is kept constant at any place and the uniformity of the screen is maintained but also spacers do not brighten or the screen is not blackened due to coagulation of the spacers and the image quality is improved. Furthermore, the cost can be decreased because the transfer dotting process and the spacer scattering process are unnecessary.

10 Claims, 7 Drawing Sheets

(Approx. 16μs FOR 1,000-row display)

COLOR FILTER, LIQUID CRYSTAL DISPLAY PANEL, LIQUID CRYSTAL DISPLAY, AND LIQUID CRYSTAL DISPLAY PANEL MANUFACTURING METHOD

BACKGROUND OF THE INVENTION

1. Field of the Invention

The present invention relates to an active-matrix liquid crystal display. More particularly, the present invention relates to a thin-film-transistor liquid crystal display (TFT-LCD) having a storage capacitance line on an array substrate.

2. Related Art

A liquid crystal display (LCD) has been noticed in recent years as a display unit substituted for a CRT (Cathode Ray Tube) which is an existing display unit. This is first because the LCD has an advantage that the occupying area of it is smaller than that of the CRT since the LCD is a flat display unit. Therefore, the LCD makes it possible to decrease office spaces and the demand for the LCD is increased on and on as portable display and household displays become popular.

Moreover, the LCD has an advantage that the power consumption is less than that of the CRT. Therefore, the LCD realizes a compact lightweight display provided with a small battery. In particular, an active-matrix liquid crystal display mounting an active element for each picture element of a liquid crystal display panel is noticed because it provides a display quality equal to that of the CRT.

FIGS. 1 and 2 are a typical schematic and a sectional view showing the structure of an existing TFT-LCD. First, the structure of the existing TFT-LCD is described below by referring to FIG. 1. The TFT-LCD comprises an array substrate 12 on which pixel electrodes 10 are formed like a matrix and a facing substrate 14 arranged so as to face the array substrate surface at a predetermined interval. A TFT 16 serving as a switching element is formed near the pixel electrodes 10 on the array substrate 12 of the TFT-LCD respectively and source electrodes 18 of these TFTs are connected to the pixel electrodes 10. A gate electrode 20 and a drain electrode 22 of a TFT are connected to the gate line 24 and data line 26 constituting a row and a column of a matrix respectively. The gate lines 24 and the data lines 26 are formed at predetermined intervals and they are all perpendicular to each other. Moreover, each pixel electrode 10 has a necessary capacitance between the pixel electrode 10 and the storage capacitance line 28. This capacitance serves as a storage capacitance 29.

As shown in FIG. 2, an existing TFT-LCD has a structure in which an undercoat layer 42, a gate electrode 20 (gate line 24), a pixel electrode 10, a gate insulating film 44, a semiconductor layer (channel layer) 46, a channel protective film 48, an ohmic contact layer 50, a passivation film 52, and an alignment film 54 are deposited on an array substrate 12. Among these layers and films, the undercoat layer 42, channel protective layer 48, passivation film 52, and alignment film 54 may not be deposited. A common electrode 30 is formed at the facing substrate 14 side of the TFT-LCD correspondingly to an area in which pixel electrodes 10 on the array substrate 12 are arranged like a matrix. Input signals are supplied to an OLB (Outer Lead Bonding) electrode 60 extended from a pixel area in which the pixel electrode 10 on the array substrate 12 is formed up to the perimeter of the area. Among the potentials of these signals, the potential of the common electrode 30 on the facing substrate is supplied from a plurality of portions of electrodes on the array substrate through a transfer 62 using conductive paste at the outside of the pixel area. The common electrode 30 is made of a transparent material such as ITO (Indium Tin Oxide) because it is necessary to pass light through the electrode 30. However, because the material has a large electric resistance, the electric resistance from a potential supply terminal to the central portion of a display screen increases as a display unit increases in size. Moreover, in the case of a color-display TFT-LCD, a color filter 32 consisting of three primary colors of red (R), green (G), and blue (B) is formed like a matrix between the facing substrate 14 and the common electrode 30 correspondingly to the pixel electrode 10 of the array substrate 12. Furthermore, a black matrix 66 is formed like a lattice. In the case of an existing liquid crystal display, transparent spherical spacers 36 are scattered in a liquid crystal layer 34 held by the array substrate 12 and the facing substrate 14 in order to keep a predetermined interval between the two substrates 12 and 14. Moreover, liquid crystal is sealed between the two substrates by a sealant 64. Furthermore, a polarizing film 38 is frequently set at the outer laterals of the array substrate 12 and the facing substrate 14. Furthermore, a direct-view transmission-type TFT-LCD has a backlight 68 and an image is outputted by controlling the transmittance of an incident light 69 emitted from the backlight 68.

FIGS. 3 and 4 show an equivalent circuit of an existing TFT-LCD. An input signal supplied to the existing TFT-LCD is described below by referring to FIGS. 3 and 4. A controller 31 converts image data into a form to be supplied to an X-driver 33 and a Y-driver 35 of a driver IC. Moreover, an analog circuit 37 generates a voltage for each input signal. Input signals to be supplied to the TFT-LCD include a scanning signal (Vg) of a gate line 24 supplied from the Y-driver 35, a display signal (Vsig) of a data line 26 supplied from the X-driver 33, a common-electrode potential (Vcom) of a common electrode 3(0, and a storage capacitance line potential (Vcs) of a storage capacitance line 28. The potentials of these input signals are all supplied to the OLB electrode 60 extended from the pixel area in which the pixel electrodes 10 on the array substrate 12 are formed up to the perimeter of the area as shown in FIG. 2. Then, among the potentials of these input signals, the potential Vcom is supplied to the common electrode 30 through the transfer 62.

In general, a liquid crystal display must be inverted and driven by AC in order to prevent liquid crystal and alignment materials from deteriorating. In the case of a TFT-LCD, the polarity inverting and driving method is classified as shown below. First, the method is classified into the following two methods because of the difference of the polarity inversion cycle of Vsig at the array substrate side: frame inversion (F inversion) and row inversion (H inversion). Among these methods, driving methods in which the polarities of adjacent display signals Vsig are opposite to each other are referred to as column inversion (V inversion) and dot inversion (H/V inversion). In the case of the F inversion and V inversion, the polarity inversion cycle of the display signal Vsig is the same as the polarity inversion cycle of the pixel electrode potential. In the case of the H inversion and H/V inversion, however, the polarity inversion cycle of the display signal Vsig is equal to or less than "1/(number of gate lines)" of the polarity inversion cycle of the pixel electrode potential.

A driving method in which a polarity is inverted because the potential of a common electrode at the facing substrate side synchronizes with the display signal Vsig is referred to as common-voltage AC inversion driving (Vcom inversion) which is distinguished from a method in which common voltage is constant. The Vcom inversion driving has an advantage that the maximum voltage amplitude of the display signal Vsig can be decreased because the voltage amplitude of the common electrode biased to the voltage amplitude of the display signal Vsig is applied to a liquid crystal layer. It is requested from the market of the TFT-LCD to lower the price of the TFT-LCD and increase the number of gradations of it. To lower the price of the TFT-LCD, it is effective to lower the price of a display-signal driver IC which is most frequently used among driving-circuit parts for driving the TFT-LCD in addition to the improvement of the yield and throughput in the manufacturing process. To lower the price of the IC, it is effective to use the Vcom inversion driving method making it possible to form a display-signal driver IC in a low-withstand-voltage process with a power supply voltage of 5 V or lower used for a general-purpose IC. The Vcom inversion driving is effective means to meet the market request for the TFT-LCD because it allows the number of gradations to easily increase.

Because it is necessary to make the polarities of all the display signals Vsig written in the pixel electrodes same under the Vcom inversion driving, it is impossible to perform V inversion or H/V inversion of adjacent display signals Vsig with different polarities. Therefore, it is necessary to apply F inversion or H inversion to the display signals Vsig. However, under the F-inversion driving, many display irregularities of screen flickers or crosstalk are observed. Therefore, combination with H inversion is practical. In fact, a TFT-LCD using the driving method according to the combination of H inversion and Vcom inversion (H/com inversion) is widely marketed.

In recent years, requests for increase in size and improvement in definition of a liquid crystal display have been strengthened according to increase of information content. However, the H/com inversion driving method is restricted in view of design for increase in size and improvement in definition of the liquid crystal display. It is inevitable to use a material with a high electric resistance such as ITO for the common electrode 30 (FIG. 2) of a TFT-LCD because the electrode requires transparency. As a result, the electric resistance from a potential supply terminal to the central portion of a display screen according to increase of a display screen in size. Moreover, to improve the definition of the display screen of a TFT-LCD, it is necessary to increase the number of indicatable rows. However, because the polarity inversion cycle of Vcom synchronizes with the selection time of a scanning signal in the case of the H/com inversion driving, the potential fluctuation cycle of Vcom shortens by being inversely proportional to the number of scanning lines (=number of gate lines), that is, the number of indicatable rows of the display screen.

Therefore, according to increase in size and improvement in definition of a TFT-LCD, the electric resistance of a common electrode increases and the potential fluctuation cycle of Vcom shortens. As a result, a problem occurs that a signal delay of Vcom happens, that is, Vcom cannot follow an input signal to be inputted to a common electrode around the central portion of a display screen. FIG. 5 shows the state of the signal delay of Vcom. In this case, the polarity inversion cycle of Vcom at the time of H/com inversion is assumed as 1 H. The problem of the signal delay of Vcom appears as a problem of the image quality such as irregularity of the display screen or decrease of the display contrast ratio in the case of a large high-definition TFT-LCD with a diagonal of 50 cm and display of approx. 1,000 rows. The problem of the signal delay of Vcom also occurs in a normal-size TFT-LCD.

Moreover, as shown in FIG. 2, the transparent spherical spacers 36 (made of plastic and glass fiber) are hitherto scattered in the liquid crystal layer 34 held by the array substrate 12 and the facing substrate 14 constituting a liquid crystal display in order to keep the substrates 12 and 14 at a predetermined interval. However, under the spacers kept scattered, liquid crystal flows in a panel when an external force is applied to the panel, the spacers are moved in a cell plane due to the flowing of the liquid crystal, and thereby the spacers may scratch the surface of the thin alignment film 54 due to the movement of the spacers. Moreover, a cell gap (interval between electrodes of two substrates) may not be kept constant due to coagulation of the spacers. Unless the cell gap is kept constant, the optical path length difference (product of the birefringence rate and cell gap of the liquid crystal) of the liquid crystal layer changes and thereby, the contrast ratio and the chromaticity of a display screen are changed. Thus, problems occur that the uniformity of the screen cannot be kept or the display quality is deteriorated. Moreover, the spacers are brightened or coagulated, and the light from the backlight 68 is cut off by the coagulated spacers and thereby the screen is blackened by the degree of cut-off light. To solve these problems, various structures are already disclosed which disuse transparent spherical spacers and instead, specify a cell gap by a pillar formed on the array substrate 12 and/or the facing substrate 14 (official gazettes of Japanese Patent Laid-Open Nos. 164723/1985, 105583/1986, 24230/1989, 134733/1986, 163428/1902, 250416/1987, and 196946/1993). However, any one of these disclosures does not show means for solving the problem of signal delay in a TFT-LCD using the H/com inversion driving method.

Moreover, as shown in FIG. 2, the existing TFT-LCD has a problem in the structure of supplying the potential of the common electrode 30 on the facing substrate 14 from a plurality of portions at the perimeter of a pixel area of the array substrate 12 side to the common electrode 30 on the facing substrate 14 through the transfer 62 using conductive paste. Because this structure requires a high-accuracy alignment of the transfer 62, it uses two or more transfers to prevent defectives from being produced due to a deviation of a transfer. However, the manufacturing yield is decreased due to defectives produced in a process for dotting a transfer. Moreover, there is the restriction on design that an area for dotting a transfer must be formed at the perimeter of a pixel area. That is, because an area independent of display must exclusively be formed on the array substrate 12 and the facing substrate 14, an effective display area to a substrate size is decreased. However, it is inevitable to use the above structure because it is indispensable for an existing liquid crystal display in view of design.

SUMMARY OF THE INVENTION

It is an object of the present invention to provide a TFT-LCD making it possible to prevent a signal delay from occurring even around the central portion of a common electrode and moreover prevent irregularity of a display screen and decrease of a contrast ration from occurring.

It is another object of the present invention to provide a TFT-LCD making it possible to keep a cell gap constant without using spacers.

It is still another object of the present invention to provide a TFT-LCD making it possible to supply a potential to a common electrode on a facing substrate without dotting a transfer.

As shown in FIG. 8, the present invention uses a pillar 78 of a color filter 32 instead of a spacer in order to keep a cell gap between two substrates constant. Then, a signal delay of a common electrode 30 is prevented from occurring by forming a portion for electrically connecting a common electrode 30 covering the pillar 78 of the color filter 32 with a storage capacitance line 28 everywhere in a pixel area and supplying a potential of the common electrode 30 from the storage capacitance line 28.

According to the present invention, the potential of the storage capacitance line 28 is supplied to the common electrode 30 on a facing substrate from joints formed everywhere in a pixel area. Originally, the common-electrode potential (Vcom) is frequently equalized with the storage capacitance line potential (Vcs) and the both potentials are supplied from the same supply source in most cases when going back to a driving circuit. Therefore, there is no problem in supplying Vcs as Vcom. Moreover, because transparency is not always requested for a material for forming a storage capacitance line, a metal with a small electric resistance is generally used as the material of the line. Therefore, by using the above structure, it is possible to supply the potential Vcom in which no signal delay occurs even around the central portion of a common electrode and prevent the existing problem on display characteristics caused by a signal delay of Vcom and due to increase in size and improvement in definition of a liquid crystal display. Moreover, this structure can be applied to TFT-LCDs other than a large or high-definition TFT-LCD and moreover applied to cases other than H/com inversion driving.

According to the above advantage, it is unnecessary to connect a storage capacitance line with a common electrode at every linkable portion and it is enough that the line and the electrode are connected at only tens of portions among millions of linkable portions. Therefore, by using the above structure, a defective due to stop of supply of a potential to be supplied to a common electrode does not occur. Moreover, it is possible to disuse a transfer set at the perimeter of a pixel area and a spherical spacer specifying a cell gap. Therefore, the productivity is improved, the number of restrictions on design is decreased, and display quality is improved. As for a transfer, because it is unnecessary that an area independent of display must hitherto be formed on an array substrate and a facing substrate and thereby an effective display area to a substrate size is decreased, it is possible to decrease the size of a liquid crystal display in the same pixel area.

However, it is possible to set the transfer and spherical spacer as ever. Moreover, the above structure is also designed so that a disconnected storage capacitance line which has been defective can be repaired because a potential can be supplied to the line from a common electrode. However, power consumption does not increase by using the above structure. Moreover, when the height of a pillar set on a facing substrate is kept at 5 μm or less, it is possible to prevent that a defective product is produced because a portion shaded by the pillar is not treated through rubbing and thereby causes incorrect orientation, even when using the pillar.

A pillar of a color filter on a facing substrate requires only change of mask patterns for the color filter but the number of processes does not increase. Moreover, it is possible to form a pillar by laminating red, green, and blue color filters or any two color filters of them. Furthermore, any sequence of colors to be laminated is not determined for a color-filter laminating portion. Furthermore, it is possible to fine-adjust a cell gap by forming a laminate structure containing a plurality of conductive materials at a position on an array substrate where a pillar is fitted on a facing substrate, connecting the laminate structure to a common electrode on the facing substrate through a conductive body layer electrically connected to a storage capacitance line, and specifying the cell gap by the sum of the height of the laminate structure on the array substrate and that of the pillar on the facing substrate.

Furthermore, it is possible to use a structure for orienting liquid crystal by rubbing an alignment film used for many liquid crystal displays currently marketed. Because the alignment film is softer than a storage capacitance line material and a common electrode material, the alignment film is removed when the both materials contact each other and thereby, the both materials can electrically be connected.

DESCRIPTION OF THE PREFERRED EMBODIMENTS

The liquid crystal display panel 70 of the embodiments 1 to 3 of the present invention is described below by referring to FIGS. 6 to 11. The liquid crystal display panel 70 of these embodiments uses an active-matrix-driving liquid crystal display.

Figure 7:
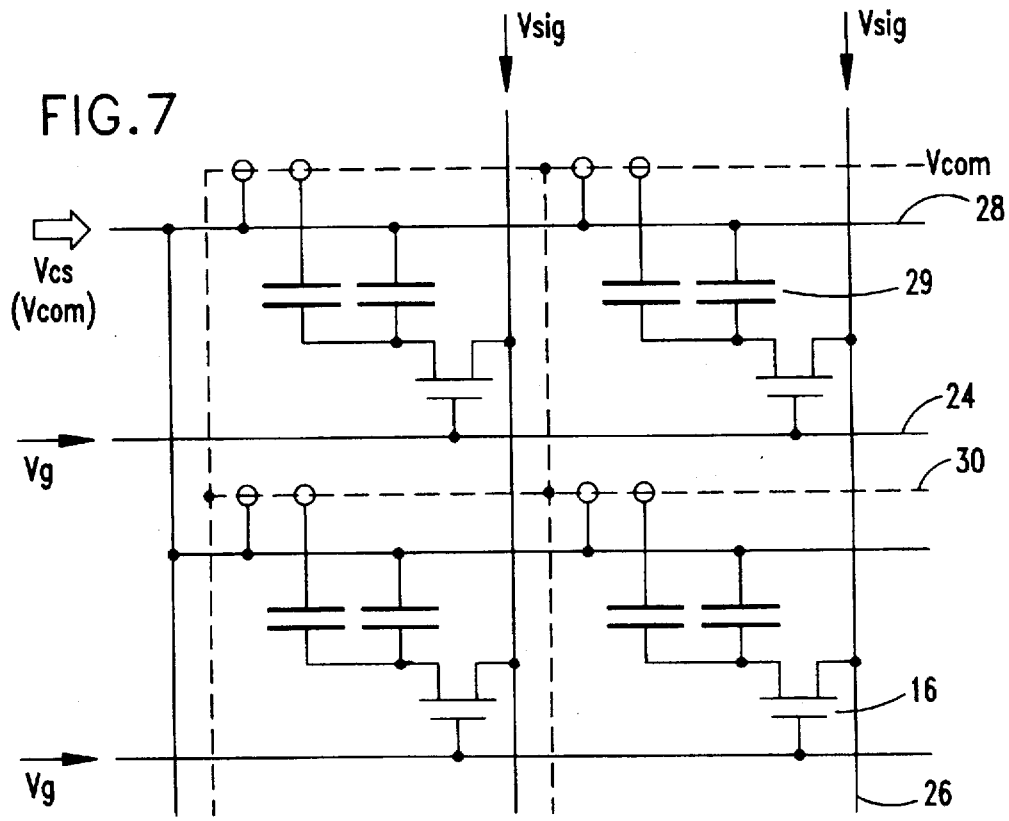
FIG. 7 shows the equivalent circuit of the TFT-LCd, of the present invention.
Figure 6:
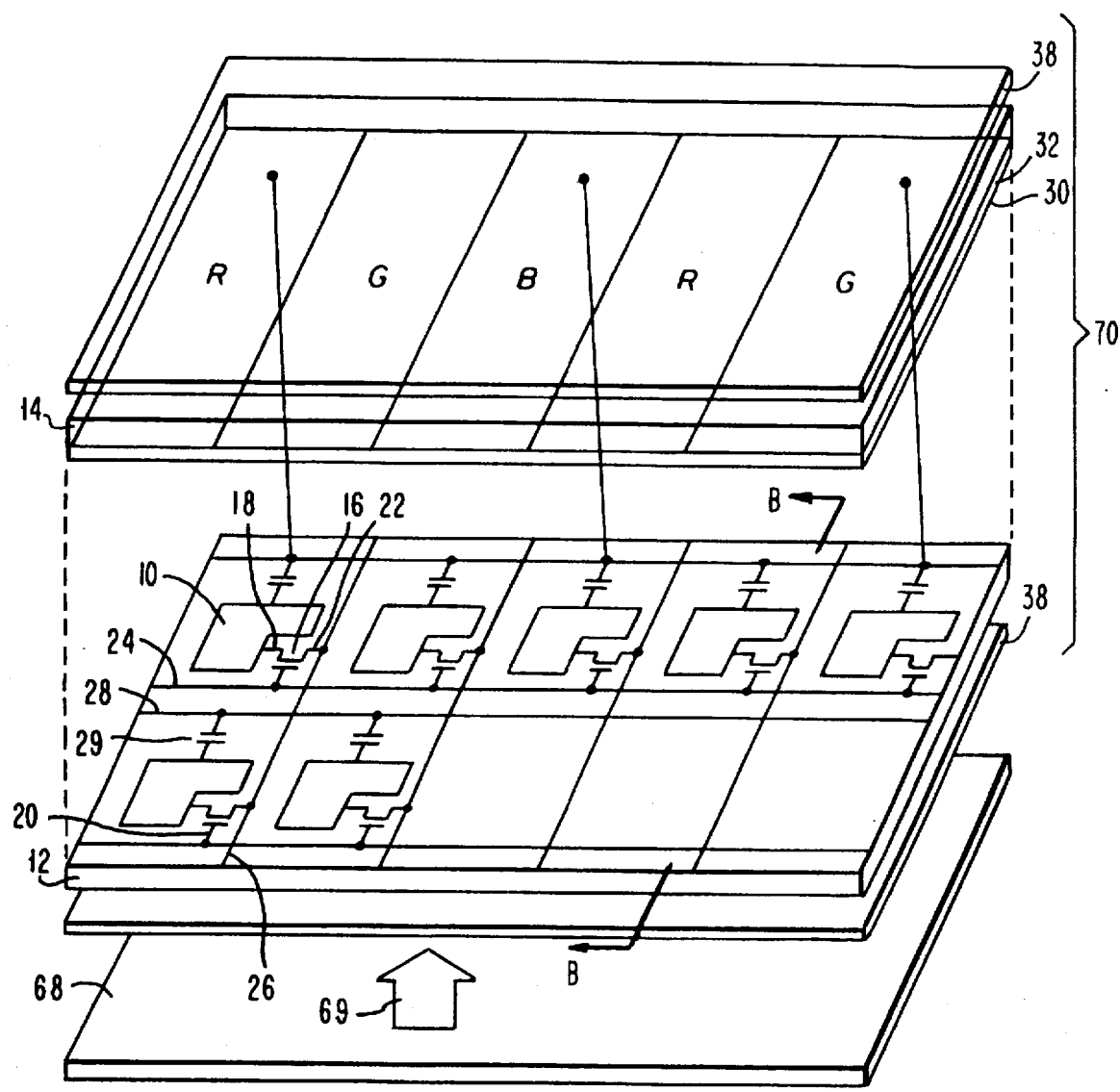
FIG. 6 shows the structure of the TFT-LCD of the present invention (perspective view)
Figure 8:
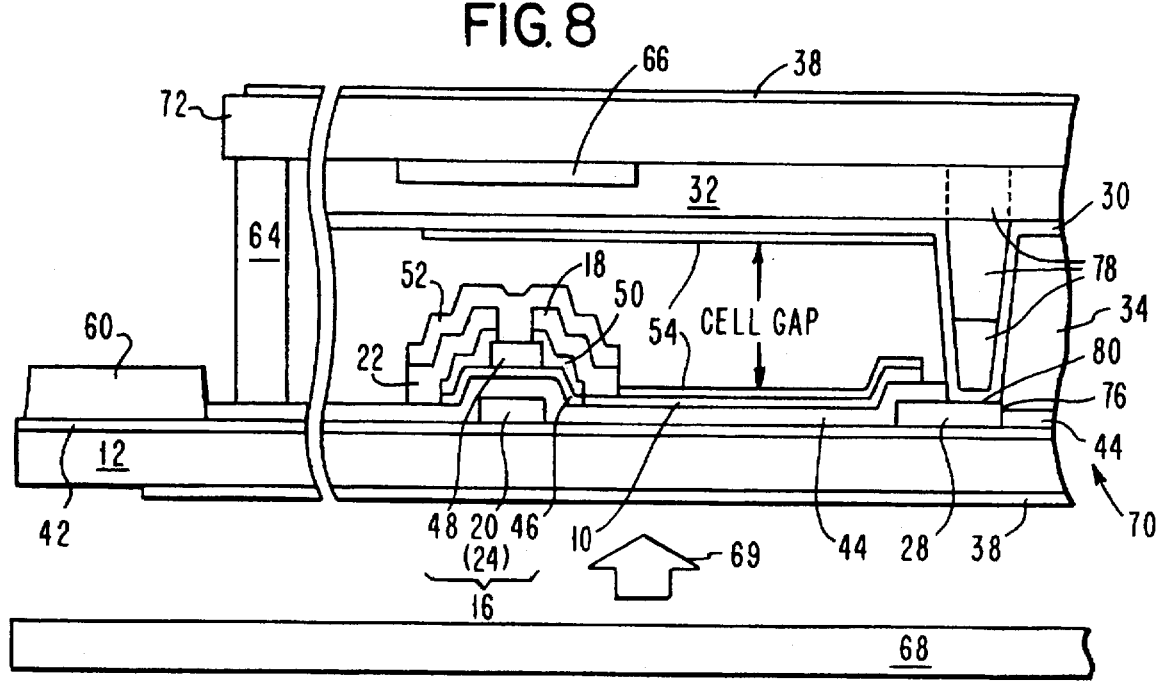
FIG. 8 shows the structure of the TFT-LCD described in the embodiment 1 of the present invention (sectional view of the structure in FIG. 6, taken along the line B—B of FIG. 6)
Figure 9:
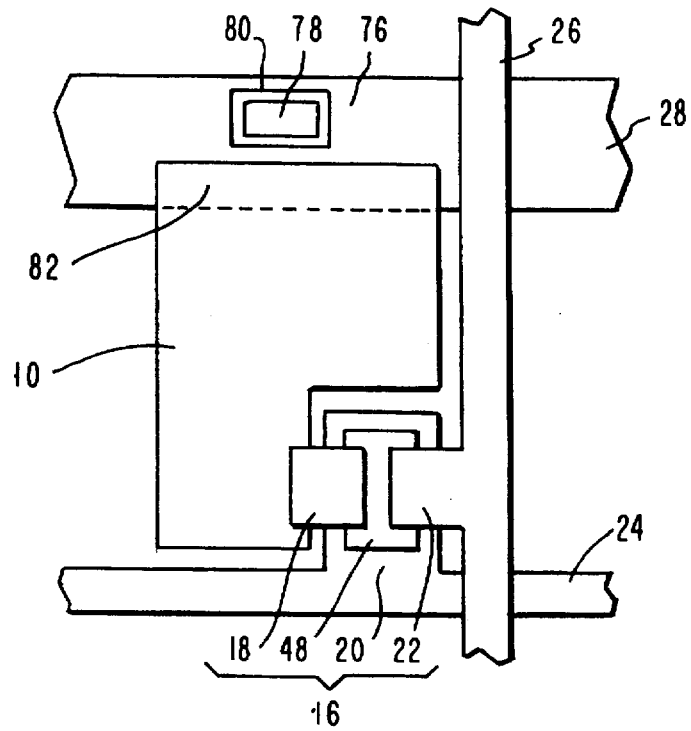
FIG. 9 shows an enlarged view of the picture-element section of the TFT-LCD described in the embodiment 1 of the present invention.
Figure 10:
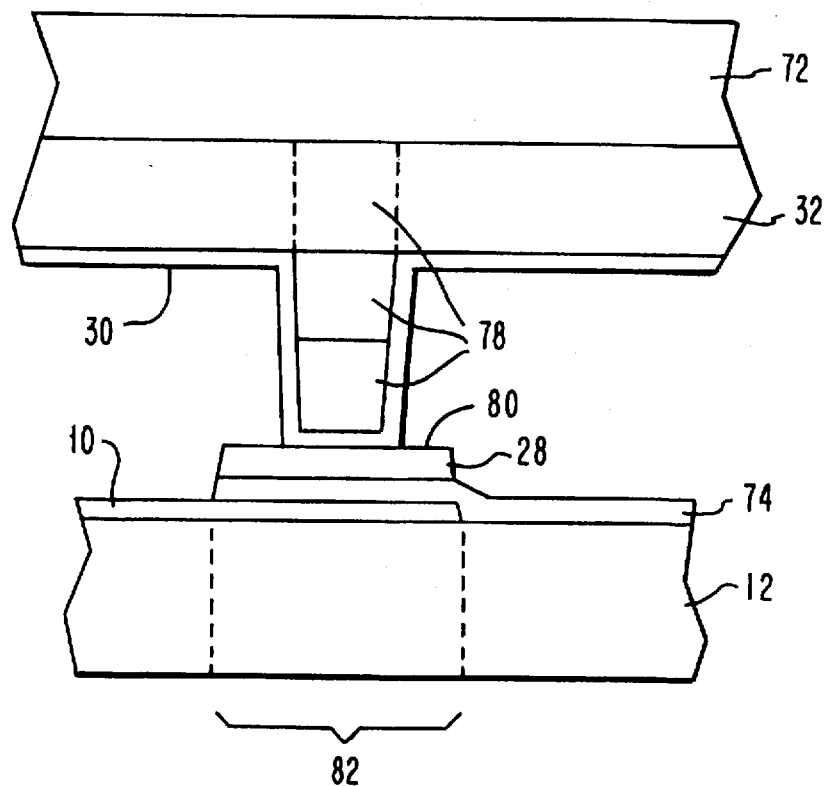
FIG. 10 shows an enlarged view of the picture-element section of the TFT-LCD described in the embodiment 2 of the present invention.
Figure 11:
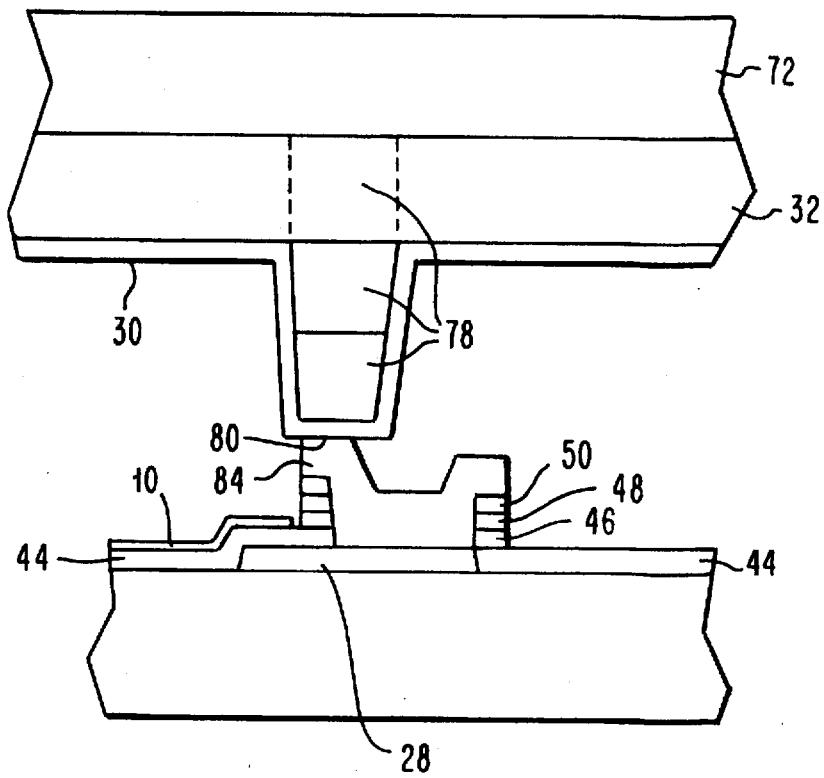
FIG. 11 shows an enlarged view of the picture-element section of the TFT-LCD described in the third embodiment of the present invention.

In the case of the embodiment 1, the liquid crystal display panel 70 is provided with an array substrate 12 and a color filter substrate 72 on which a color filter 32 is formed as a facing substrate as shown in FIGS. 6 to 8. Moreover, as shown in FIG. 8, an undercoat layer 42, a gate electrode 20 (gate line 24), a pixel electrode 10, a gate insulating film 44, a semiconductor layer (channel layer) 46, a channel protective layer 48, an ohmic contact layer 50, a passivation film 52, and an alignment film 54 are formed in order on the array substrate 12. Among these layers and films, the undercoat layer 42, channel protective layer 48, passivation film 52, and alignment film 54 may not be formed. Moreover, as shown in FIG. 9, a TFT 16 is arranged near the intersection between the gate line 24 and the data line 26 and the gate electrode 20 of the TFT is formed by extending part of the gate line 24 and the drain electrode 22 of the TFT is formed by extending part of the data line 26. The source electrode 18 of the TFT is electrically connected to the pixel electrode 10.

Furthermore, as shown in FIG. 8, the embodiment 1 may have a structure in which the gate insulating film 44 is formed on the storage capacitance line 28 in a pixel area on the array substrate 12. That is, the embodiment 1 has a structure in which a hole 76 is formed at part of the gate insulating film 44 on the storage capacitance line 28, the common electrode 30 at a portion covering the pillar 78 of a color filter formed on the color filter substrate 72 is overlapped with the position of the hole 76, and the common electrode 30 contacts the storage capacitance line 28 so that they are electrically connected each other. Though the storage capacitance line 28 contacts the common electrode 30 on the color filter substrate 72 through the hole 76 of the gate insulating film, the alignment film 54 may be formed on the whole surfaces of the pixel areas of the array substrate 12 and the color filter substrate 72 at the contact plane between the line 28 and the substrate 72. However, also in this case, by rubbing the alignment film 54 covering the storage capacitance line 28 viewed through the hole 76 on the array substrate 12 with the common electrode 30 covering the pillar 78 on the color filter substrate 72 when superimposing the array substrate 12 on the color filter substrate 72, part of the alignment film 54 is shaved and the storage capacitance line 28 is electrically connected with the common electrode 30. For this, the object of the present invention is achieved when only tens of portions are connected among millions of linkable portions. Therefore, there is no problem even if there are imperfectly-connected portions.

Figure 1:
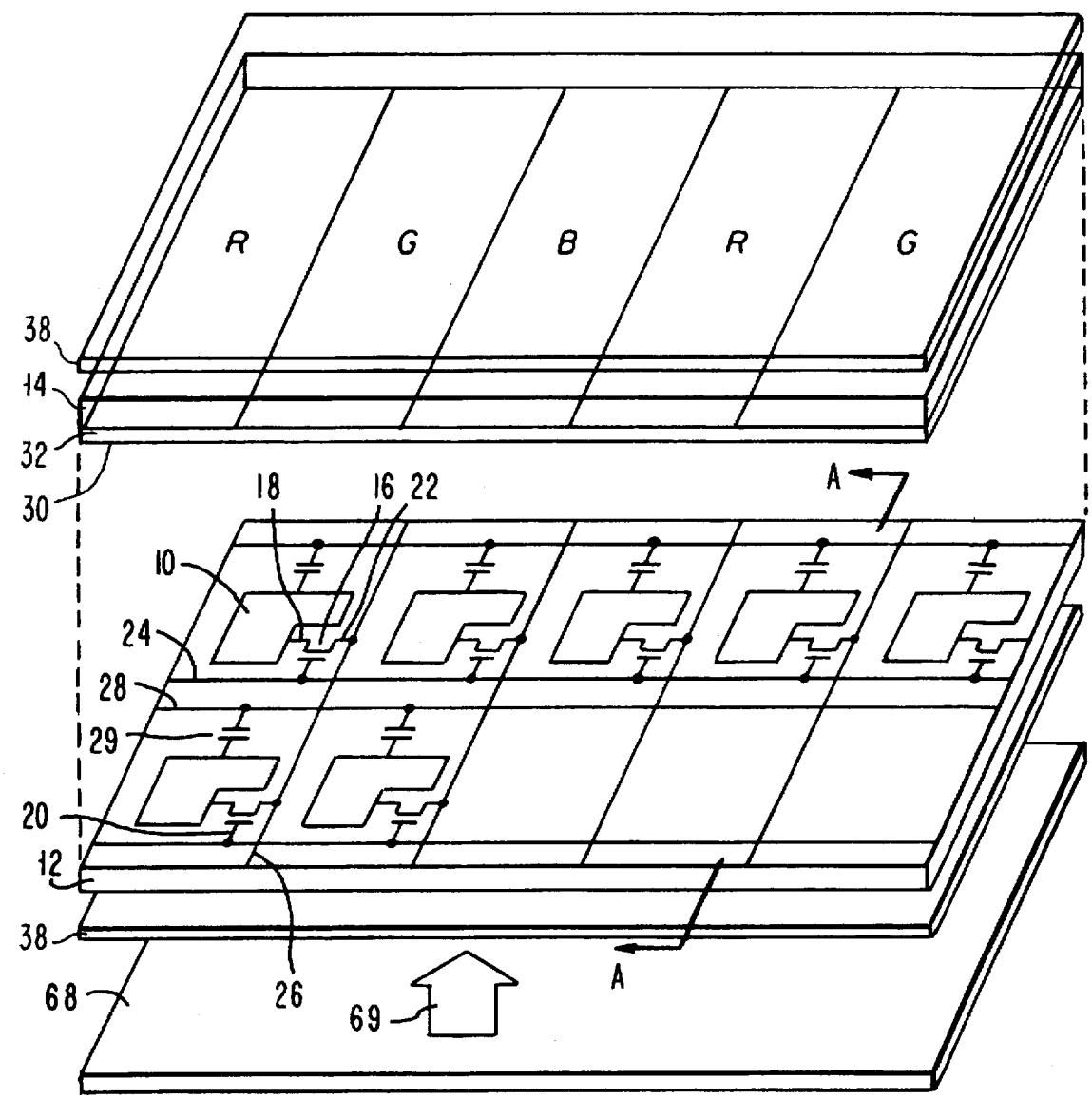
FIG. 1 shows the structure of an existing TFT-LCD (perspective view)
Figure 2:
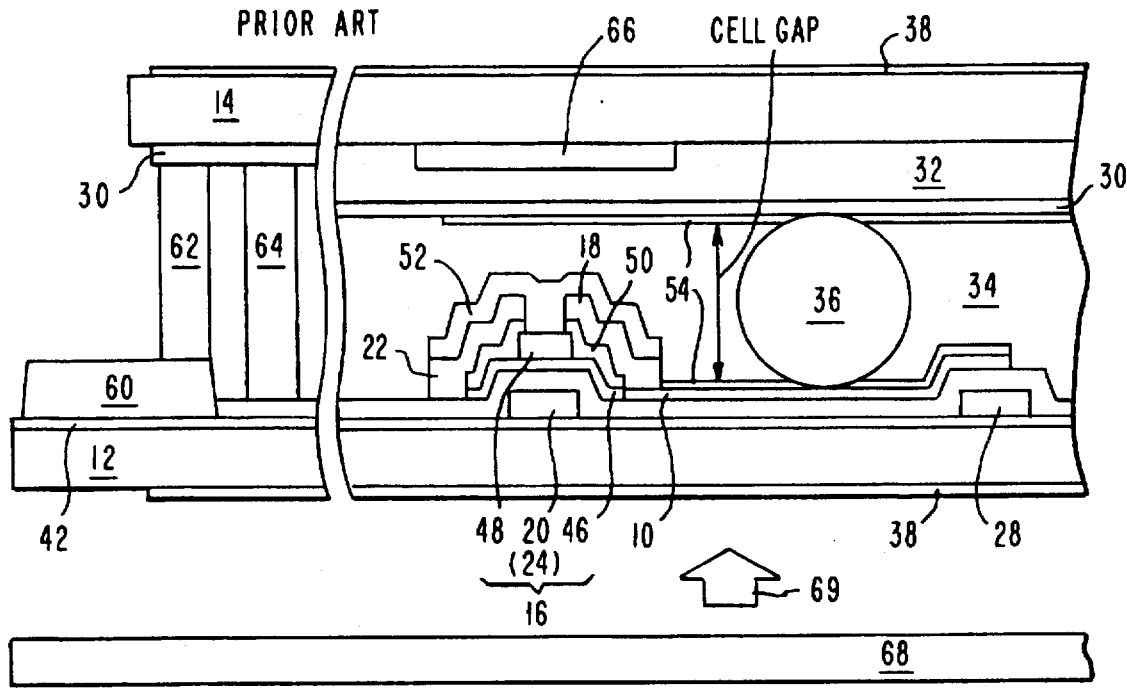
FIG. 2 shows the structure of the existing TFT-LCD (sectional view of the structure in FIG. 1, taken along the line A—A of FIG. 1)
Figure 5:
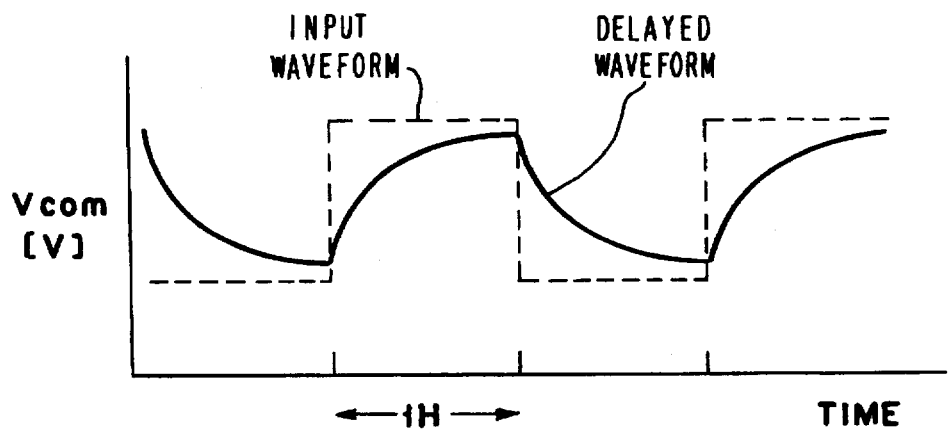
FIG. 5 shows a signal delay of Vcom.
Figure 3:
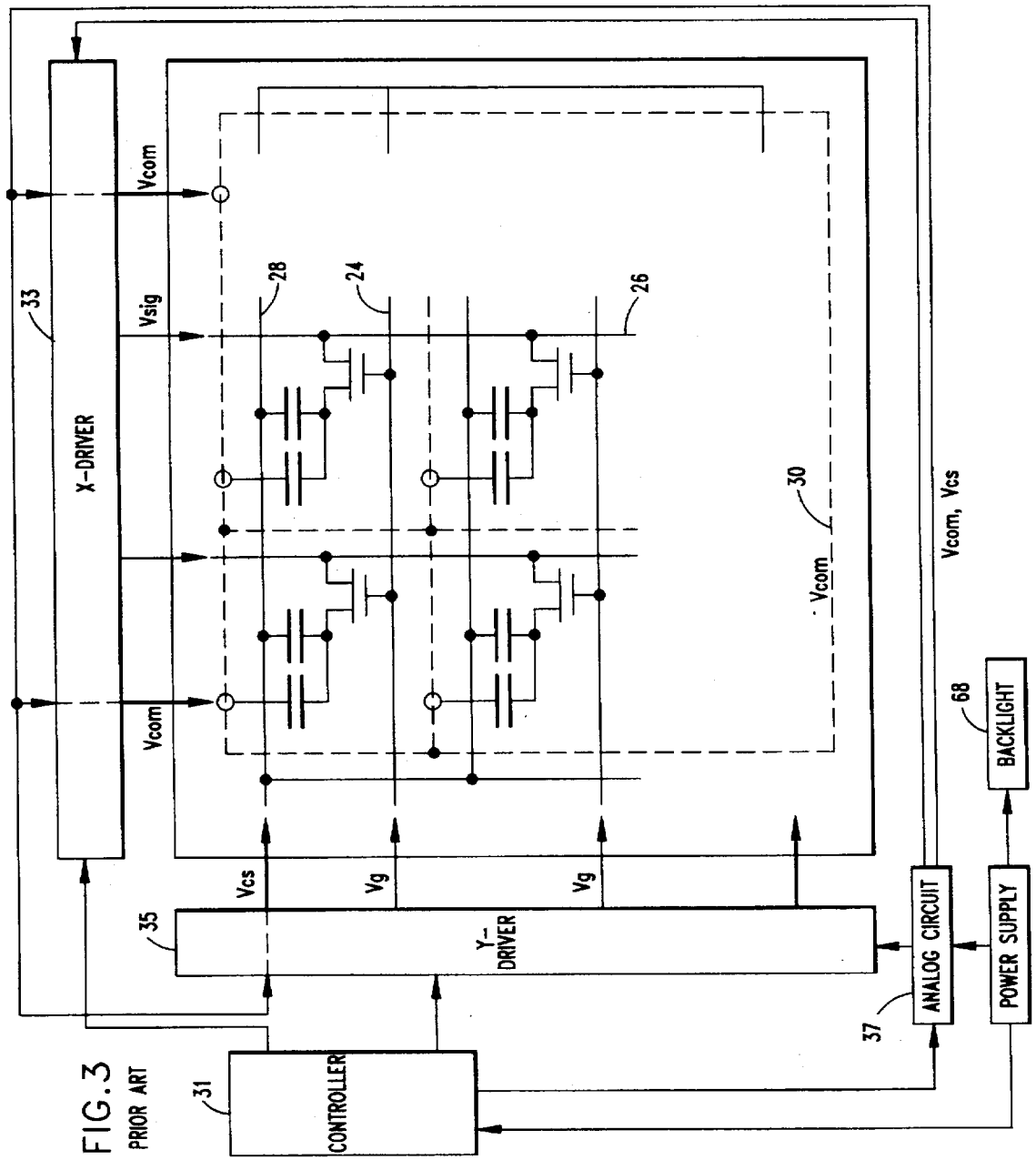
FIG. 3 shows the equivalent circuit of the existing TFT-LCD.
Figure 4:
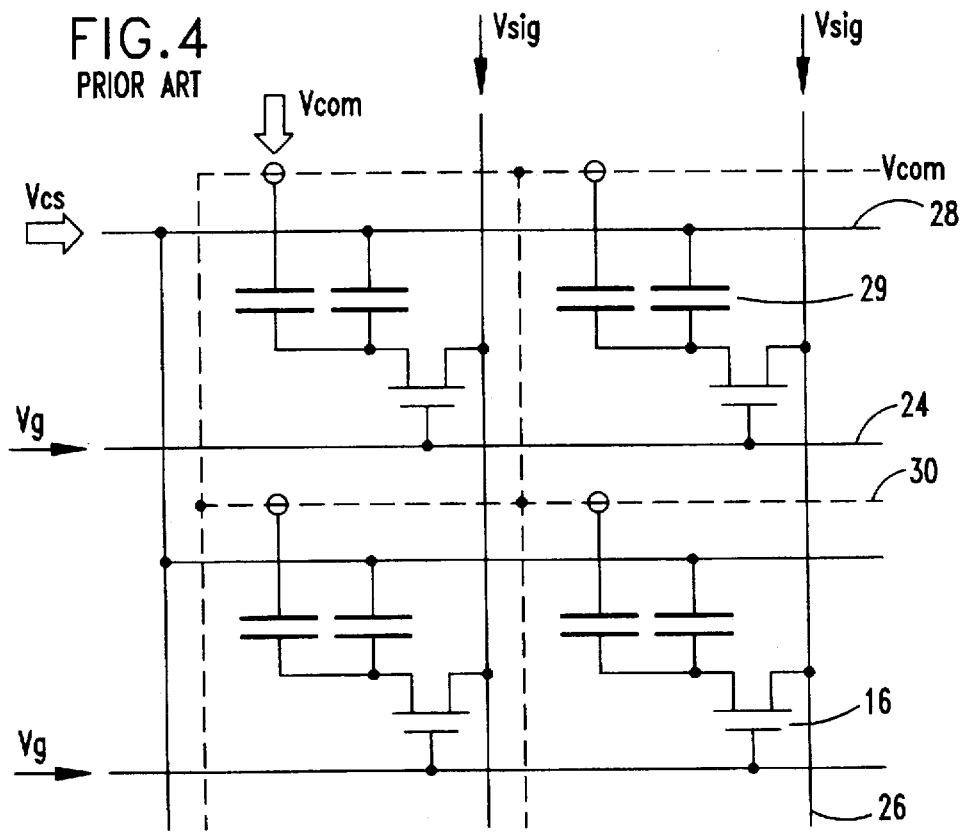
FIG. 4 shows the equivalent circuit of the existing FFT-LCD (enlarged view)

Moreover, the present invention does not require a spherical spacer for specifying a cell gap or transfer for supplying a potential to the common electrode 30 as shown in FIG. 8. However, there is no problem in using the spacer and transfer. The equivalent circuit of the TFT-LCD of the present invention is shown in FIG. 7 for comparison with the circuit in FIG. 4. As shown in FIG. 7, the advantages are obtained that the problem of signal delay of Vcom is solved because Vcom is equal to Vcs everywhere in a screen by applying the present invention and it is unnecessary to independently supply Vcom from the outside.

As another method for connecting a common electrode with a storage capacitance line, the storage capacitance line 28 may be formed on the pixel electrode 10 formed on the array substrate 12 through the insulating film 74. In this case, a joint 80 between the storage capacitance line 28 and the common electrode 30 covering the pillar 78 of a color filter is three-dimensionally superimposed on a storage capacitance area 82.

In the case of the third embodiment, a layer 84 made of a conductive body such as a metal formed simultaneously with the data line 26 is first formed on the storage capacitance line 28, and then it is connected with the common electrode 30 to constitute the joint 80 instead of directly connecting the common electrode 30 to the storage capacitance line 28 like the first and second embodiments. Therefore, it is possible to perform fine adjustment for realizing an optically-optimized cell gap by the formation of the conductive body.

Then, the process for manufacturing the liquid crystal display panel 70 of this embodiment is described below.

First, the process for manufacturing the array substrate 12 is described below.

In the first process, the undercoat layer 42 is formed on the array substrate 12.

In the second process, the gate electrode 20, gate line 24, and storage capacitance line 28 are formed on the undercoat layer 42.

In the third process, the gate insulating film 44 is formed.

In the fourth process, the semiconductor layer 46 of the TFT 16 is formed.

In the fifth process, the pixel electrode 10 is formed.

In the sixth process, the hole 76 is formed on part of the gate insulating film 44 on the storage capacitance line 28.

In the seventh process, the source electrode 18 and drain electrode 22 of the TFT 16 and the data line 26 are formed.

In the eighth process, the passivation film 52 covering the TFT 16 is formed.

In the ninth process, the alignment film 54 is formed and treated through rubbing.

Then, the method for manufacturing the color filter substrate 72 is described below.

In the first process, the color filter 32 is formed on the facing substrate 14, and the pillar 78 of a color filter is formed at a position corresponding to the hole 76 on the array substrate 12.

In the second process, the common electrode 30 is formed on the color filter 32.

In the third process, the alignment film 54 is formed and treated through rubbing.

The array substrate 12 and the color filter substrate 77 finished through the above processes are made to face each other and the storage capacitance line 28 viewed through the hole 76 on the array substrate 12 is overlapped with the common electrode 30 at the portion covering the pillar 78 of a color filter on the facing substrate 14 to electrically connect them each other.

Then, the liquid crystal display panel 70 is finished by sealing the perimeter of the assembly with a sealant 64, injecting liquid crystal into the assembly through an injection hole (not illustrated), and closing the injection hole.

The present invention provides a large high-definition liquid crystal display without causing a signal delay even around the central portion of a common electrode. Moreover, because the present invention disuses processes for scattering spacers and dotting transfers, the yield is improved and the cost is decreased.

I claim:

1. A color filter and common electrode carried by a facing substrate for assembly with an array substrate to form a liquid crystal display panel, the color filter comprising a plurality of pillars formed higher than other portions of the color filter for contact with objects formed on the array substrate to specify a cell gap, wherein the pillars are covered with the common electrode.

2. The color filter according to claim 1, wherein the pillars have a laminate structure made of at least two color materials of red, green, and blue color-filter forming materials.

3. A liquid crystal display panel comprising:
an array substrate having pixel electrodes arranged like a matrix, an active element for each of the pixel electrodes, a storage capacitance provided at some of the pixel electrodes, and a storage capacitance line for outputting the reference potential of the storage capacitance;

a facing substrate having a plurality of pillars arranged so as to face the array substrate, the pillars being formed higher than other portions of the facing substrate, the pillars together with objects formed on the array substrate that face the pillars specifying a cell gap, and a common electrode for all pixels covering at least some of the pillars, the common electrode being electrically connected to the storage capacitance line at the portions of the common electrode covering the pillars; and a liquid crystal layer held between the array substrate and the facing substrate.

4. The liquid crystal display panel according to claim 3, wherein the facing substrate has red, green, and blue color filters formed correspondingly to the pixel electrodes and the pillars are made of color-filter forming materials.

5. The liquid crystal display panel according to claim 4, wherein the pillars have a laminate structure of at least two color materials of red, green, and blue color-filter forming materials.

6. The liquid crystal display panel according to claim 3, wherein the storage capacitance line has a laminate structure of a plurality of conductive materials where the common electrode is electrically connected to the storage capacitance line at the pillars.

7. A liquid crystal display comprising:

an array substrate having pixel electrodes arranged like a matrix, an active element for each of the pixel electrodes, a storage capacitance provided at some of the pixel electrodes, and a storage capacitance line for outputting the reference potential of the storage capacitance;

a facing substrate having a plurality of pillars arranged so as to face the array substrate, the pillars being formed higher than other portions of the facing substrate, the pillars together with objects formed on the array substrate that face the pillars specifying a cell gap, and a common electrode for all pixels covering at least some of the pillars, the common electrode being electrically connected to the storage capacitance line at the portions of the common electrode covering the pillars;

a liquid crystal layer held between the array substrate and the facing substrate; and a polarizing film set at least either of the top of the facing substrate and the bottom of the array substrate.

8. The liquid crystal display according to claim 7, wherein a driver IC and a backlight for emitting light are included.

9. A liquid crystal display panel manufacturing method comprising the steps of:

determining the height of a laminate structure and storage capacitance line to be formed on an array substrate, the laminate structure including a plurality of conductive materials electrically connected with the storage capacitance line, and determining the height of pillars of a color filter to be formed on a color filter substrate so that the sum of these heights specifies the distance between the array substrate and the color filter substrate;

forming the storage capacitance line on the array substrate and the laminate structure on the storage capacitance line, the array substrate having pixel electrodes arranged like a matrix and active elements arranged in the vicinity of the pixel electrodes, so that the storage capacitance line and the laminate structure have the determined height thereof;

forming the color filter at positions corresponding to the pixel electrodes on the color filter substrate and also forming pillars of the color filter so that the pillars have the determined height thereof;

superimposing the array substrate and the color filter substrate so that the laminate structure and the pillars of the color filter butt each other and sealing the circumferences of the superimposed array substrate and color filter substrate; and injecting liquid crystal between the array substrate and the color filter substrate whose circumferences are sealed.

10. The liquid crystal display panel manufacturing method according to claim 9, wherein the pillars are formed of color filter material simultaneously with the color filter.

* * * * *